T. G. PADDACK.
STRIP SEVERING MACHINE.
APPLICATION FILED APR. 30, 1909.
972,221.
Patented Oct. 11, 1910.
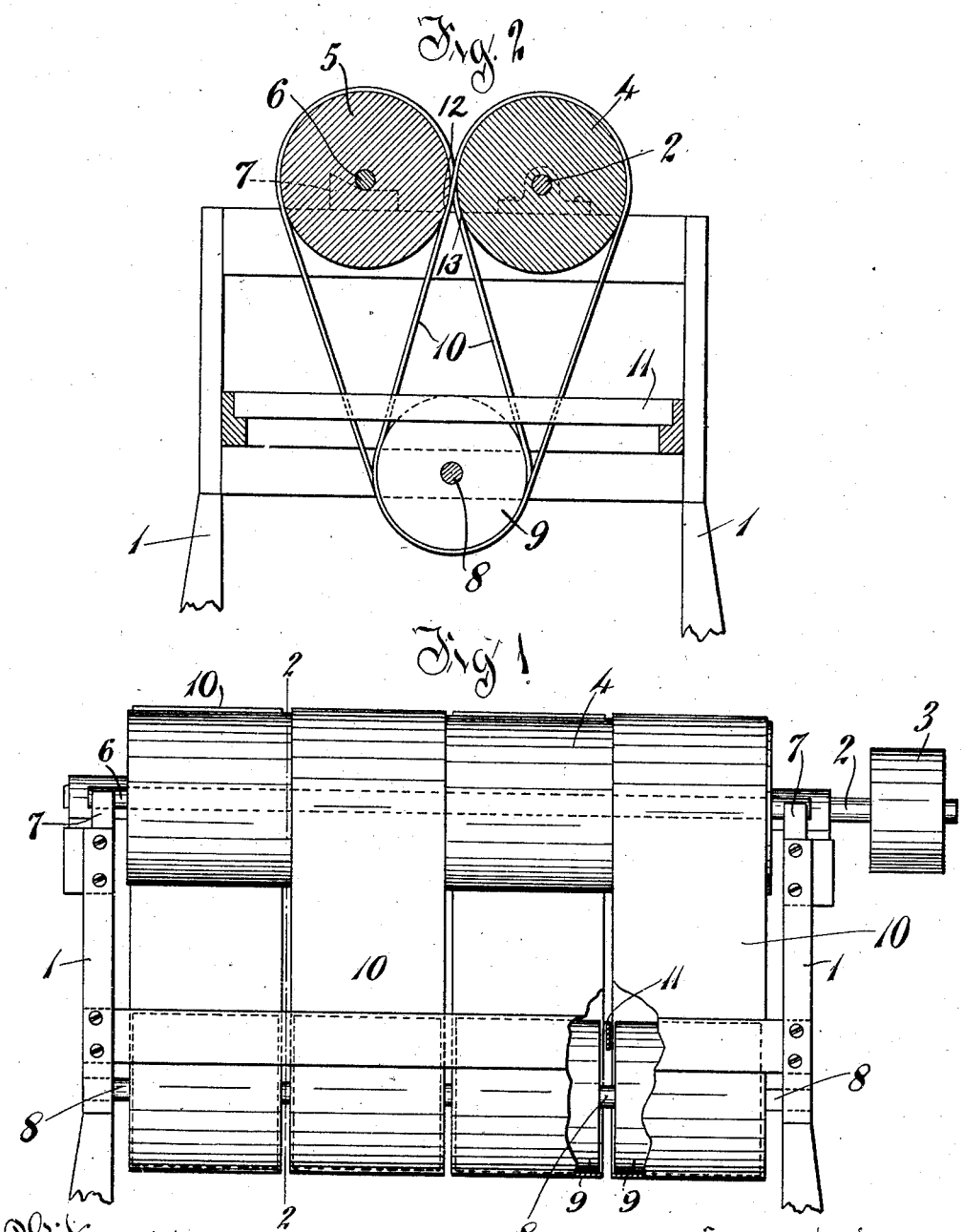

UNITED STATES PATENT OFFICE.

TRUMAN G. PADDACK, OF WYOMING, OHIO, ASSIGNOR TO THE STEARNS AND FOSTER COMPANY, OF CINCINNATI, OHIO, A CORPORATION OF OHIO.

STRIP-SEVERING MACHINE.

972,221.

Specification of Letters Patent. Patented Oct. 11, 1910.

Application filed April 30, 1909. Serial No. 493,162.

*To all whom it may concern:*

Be it known that I, TRUMAN G. PADDACK, a citizen of the United States, residing in Wyoming, in the county of Hamilton and State of Ohio, have invented certain new and useful Improvements in Strip-Severing Machines, of which the following is a full, clear, and exact description, reference being had to the accompanying drawings, forming part of this specification.

The object of my invention is to provide a machine for severing soft and pliable material into strips, and it consists of that novel construction and arrangements of parts to be hereinafter particularly pointed out and claimed.

In the drawings Figure 1 is a front elevation of my machine. Fig. 2 is a cross section thereof taken on the lines 2, 2 of Fig. 1.

1, 1 represents a suitable standard or frame on the end supports of which is journaled the driving shaft 2, driven by the pulley 3, or in any other suitable way, and this shaft 2 has the roller 4 secured thereon between the end supports of the frame.

5 is a roller of the same diameter as the roller 4, having its spindle 6 resting on and supported by the blocks 7, 7, secured on the frame, so that the roller will bear against the roller 4 and be rotated by contact therewith at the same rate of speed as the roller 4 is driven, or this roller may be driven directly as in the case of the roller 4 by a belt and pulley or otherwise.

8 is a shaft journaled in the framework underneath the rollers 4 and 5, and this shaft carries a series of idler pulleys 9, 9. As many of these pulleys are provided as may be required, and each pulley carries an endless belt 10, 10 one belt running over the roller 4, and the next belt over the roller 5, and so on alternately for as many pulleys as may be employed. The belts are prevented from shifting and interfering with each other by being separated by thin strips 11, which are secured to the frame in front and rear.

The rollers 4 and 5 are of the same diameter, and the pulleys 9, 9 are also each of the same diameter, so that the belts travel uniformly, and at the same rate of speed, and the belts for a short distance where the roller 5 rests in contact with the roller 4, travel together and then one belt passes downwardly to the right, and the next belt downwardly to the left and so on alternately. With this construction the belts from each roller 4 and 5 will travel for a short distance in contact with the adjoining roller as indicated at 12 and 13 in Fig. 2. The rollers are driven at any desired speed to correspond with the speed at which the material to be severed is delivered to the machine.

The machine is especially designed for severing of the strips of cotton wadding and the like. The belts are furnished of the width of the strips desired, and the sheet of material is fed down between the rollers 4 and 5, and as the belts separate, the sheet is divided into strips one strip following one belt and the next following the next belt, and so on through the width of the machine, and the sheet is delivered therefrom divided into strips of the desired width and wound up in rolls or otherwise disposed of as may be desired. A comparatively smooth line of severance is obtained for the strips by reason of the fact that the belts travel in contact with the opposite roller for a short distance, so that the strips are held firmly between the roller and belt as they are severed.

Having thus described my invention what I claim as new and desire to secure by Letters Patent, is:

1. In a machine of the character specified, a roller journaled in the framework, with means for driving same, and a similar roller supported on said framework in contact with the driven roller, a plurality of idler pulleys independent of each other mounted in the frame in close proximity to each other, and a plurality of endless belts one for each pulley mounted alternately on the driven roller and the roller driven thereby, the belts being mounted in close proximity to each other, with their surface planes diverging, whereby a sheet of material will be severed at the line of divergence.

2. In a machine of the character specified, a roller journaled in the framework, with means for driving same, and a similar roller supported on said framework in contact with the driven roller, a plurality of idler pulleys independent of each other mounted in the frame in close proximity to each other, and a plurality of endless belts one for each pulley mounted alternately on the driven roller and the roller driven thereby, the belts being mounted in close proximity to each other, with their surface planes diverging, with the belts of one roller running in contact for a short distance with the surface of the opposite roller, whereby a sheet of material will be severed at the line of divergence.

3. In a machine of the character specified, a roller journaled in the framework, with means for driving same, and a similar roller of equal diameter therewith, with inclined supports on the frame therefor to bring said roller into contact with the driven roller, a plurality of idler pulleys, independent of each other, mounted in the frame in close proximity to each other underneath said rollers, and a plurality of endless belts, one for each pulley and mounted alternately on the driven roller, and the roller driven thereby whereby the belts will diverge below said rollers, substantially as and for the purpose described.

TRUMAN G. PADDACK.

Witnesses:
ARTHUR H. EWALD,
BESSIE A. BEALL.